April 29, 1969 H. L. LAWALIN ET AL 3,441,002
BIRD FEED PACKAGE CONVERTED FEEDER
Filed April 12, 1967
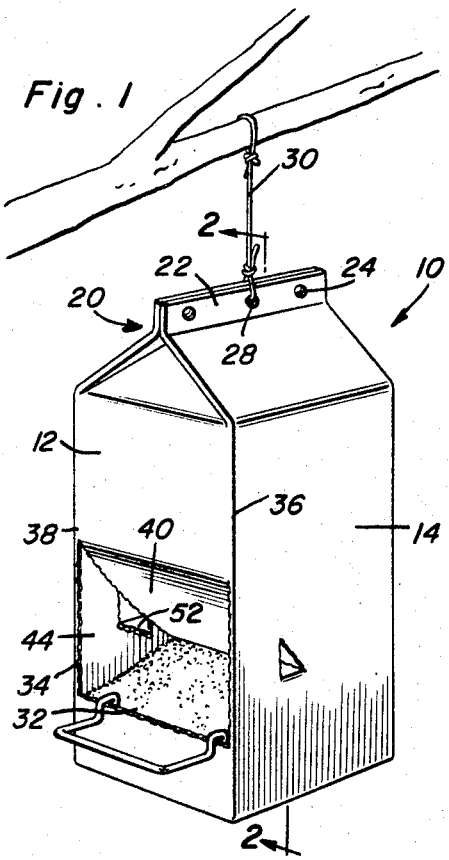
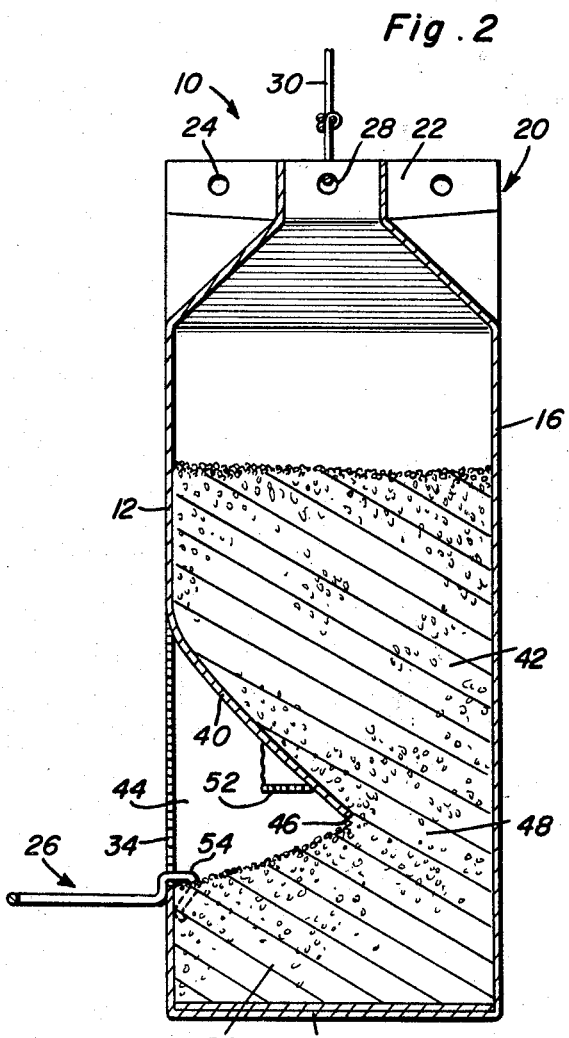
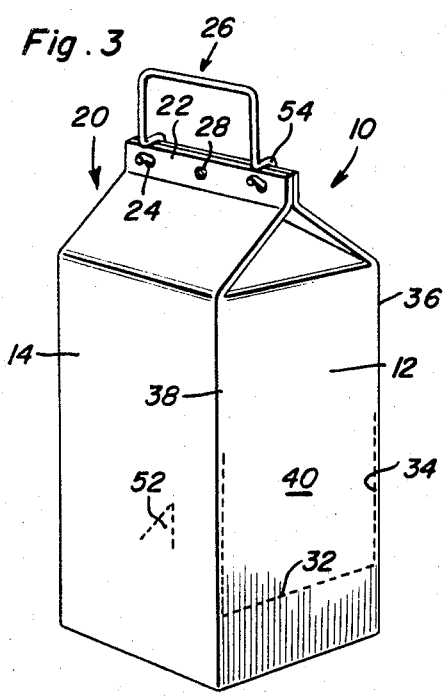
Harold L. Lawalin
Kenneth Skirvin
INVENTORS
BY Clarence A. O'Brien
and Harvey B. Jacobson
Attorneys

United States Patent Office 3,441,002
Patented Apr. 29, 1969

3,441,002
BIRD FEED PACKAGE CONVERTED FEEDER
Harold L. Lawalin, 1310 Exeter Ave., Indianapolis, Ind., and Kenneth Skirvin, Greenwood, Ind. (145 E. Market St., Indianapolis, Ind. 46204)
Filed Apr. 12, 1967, Ser. No. 630,355
Int. Cl. A01k 39/00; B65d 79/00, 5/72
U.S. Cl. 119—52                    10 Claims

ABSTRACT OF THE DISCLOSURE

A bird seed container adapted to be converted into a feeder by inwardly displacing a rectangular flap formed by perforations in one of the vertical side walls of the container. Downwardly folded tabs hold the flap within the volume enclosed by the container to form an outlet opening and an internal throat impeding free flow of bird seed into a lower feeding portion of the container on which a perch is mounted.

---

The present invention pertains to the packaging and dispensing of granular material, such as bird seed and more particularly to a vertically elongated container modified so that it may be readily converted into a bird feeder.

An important object of the present invention is to provide a paperboard type of container for bird seed or the like capable of being readily converted into a feeder with a minimum of effort or skill.

Another object of the present invention is to provide a bird seed container capable of being converted into a feeder, the container being modified for this purpose at a minimum expense to the manufacturer or packager.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing a bird seed container converted into a feeder in accordance with the present invention.

FIGURE 2 is a longitudinal sectional view through the feeder taken substantially through a plane indicated by section line 2—2 in FIGURE 1.

FIGURE 3 is a perspective view of the bird seed package prior to conversion into a feeder.

Referring now to the drawings in detail, it will be observed that the combined package and feeder generally referred to by reference numeral 10 is basically a vertically elongated container rectangular in cross-section and formed of a suitable, relatively thin, self-supporting sheet material such as cardboard. The basic container is folded at its corners and sealed in a fashion well-known to those skilled in the art forming four planar side walls, consisting of the front wall 12, a pair of supporting walls 14 and a back wall 16 interconnected at the lower ends by a reinforced bottom wall 18. The upper end of the container is closed by a folded roof formation 20 which includes a sealed portion 22. In one embodiment of the invention, the sealed portion 22 is provided with a pair of end apertures 24 adapted to receive a carrying handle 26 as shown in FIGURE 3. A central aperture 28 is also formed in the portion 22 so that the container may be suspended from any suitable location by means of a string 30 for example as shown in FIGURE 1.

Referring now to FIGURE 3, it will be observed that the container 10 is provided on its front wall with perforations forming a horizontal edge 32 which extends between the supporting side walls 14 interconnecting the vertical lines of perforations 34 formed adjacent to the corners 36 and 38 in order to define a rectangular flap 40. Normally, the flap 40 formed by the perforations is maintained coplanar with the front wall 12 by the contents of the container. Thus, as shown in FIGURE 2, the volume enclosed by the container is partially filled with bird seed 42 so that when the container is inverted, the flap 40 may be pushed inwardly and upwardly to the position as viewed in FIGURE 2. When the flap is pushed inwardly, it forms a rectangular opening 44 in the front wall 12 of the container located closer to the bottom wall than the upper roof formation 20. Also, the lower edge 46 of the flap 40 forms an internal throat 48 impeding downward flow of the bird seed into the lower feeding portion 50 of the container. The flap is thereby operative to retain the bird seed within the container yet expose a substantial surface thereof through the opening 44.

Formed on each of the supporting side walls 14, by means of perforations, are right triangular tabs 52 adapted to be folded inwardly into the container and downwardly as viewed in FIGURES 1 and 2. When the tabs 52 are folded inwardly perpendicular to the vertical side walls of the container, the flap 40 will be held in the open position shown in FIGURES 1 and 2 since the tabs project in front of the flap. The tabs 52 are therefore positioned between the front and back walls of the container intermediate the upper and lower ends of the vertical lines of perforations 34.

As a final step to converting the package 10 into a bird feeder, the handle element 26 may be removed from the apertures 24 and the hook portions 54 thereof placed over the horizontal edge 32 of the opening 44 so that the handle element extends horizontally away from the front wall 12 forming a perch. The feeder may then be hung in any suitable location.

It will be apparent from the foregoing description, that the bird feed package described may be readily converted into a feeder by simply inverting the package in order to permit inward displacement of the flap 40 and locking of the flap in the inwardly displaced position by means of the holding tabs 52. The container is therefore only partially filled with bird seed. The container handle 26 may then be remounted on the horizontal edge 32 in order to form a perch extending away from the opening formed in the front wall of the container. The flap 40 not only forms the opening through which the bird seed is exposed, but restricts the down flow of seed into the lower feeding portion 50 so as to store feed thereabove as well as to maintain the lower feed portion full.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A package and dispenser for granular material comprising a thin-walled, vertically elongated container having vertical planar side walls interconnected in angular relation to each other by a bottom wall and an upper roof formation to enclose a volume partially filled by said granular material, one of said side walls having perforations forming a depending movable flap displaceable inwardly into said enclosed volume to form an opening closer to the bottom wall than the roof formation, second and third side walls on either side of said one of the side walls being provided with tabs downwardly folded into the enclosed volume and engageable with the flap to hold the same in an inwardly displaced position forming an internal throat within the container above which a portion of said granular material is held.

2. The combination of claim 1 wherein said perforations forming the flap define a horizontal edge on said one of the side walls extending between said second and third side walls peripherally bounding the opening formed in said one of the side walls.

3. The combination of claim 2 wherein said opening and flap are rectangular in shape, said tabs being triangular in shape.

4. The combination of claim 3 wherein said throat is formed between a lower edge of the flap and a fourth of the side walls of the container.

5. The combination of claim 4 including a handle element having hook portions engageable with the roof formation, said hook portions horizontally supporting the handle element on the horizontal edge of said opening to form a perch extending horizontally away from the container.

6. The combination of claim 1 including a perch element having hook portions engageable with said one of the side walls in the opening formed therein.

7. The combination of claim 6 wherein said opening and flap are rectangular in shape, said tabs being triangular in shape.

8. The combination of claim 1 wherein said opening and flap are rectangular in shape, said tabs being triangular in shape.

9. The combination of claim 1 wherein said throat is formed between a lower edge of the flap and a fourth of the side walls of the container.

10. A combined package and feeder of bird seed comprising a container having side walls interconnected in angular relation to each other by a bottom wall and an upper roof formation to enclose a volume partially filled by said bird seed, a depending movable flap formed in one of said side walls displaceable inwardly into said enclosed volume to form an outlet opening, and downwardly foldable tabs formed in the other of the side walls to engage and hold the flap within said enclosed volume.

References Cited

UNITED STATES PATENTS

| | | | |
|---|---|---|---|
| 2,230,058 | 1/1941 | Hornung | 119—52 |
| 2,340,976 | 2/1944 | Nevins | 229—17 |
| 2,556,707 | 6/1951 | Rendall et al. | 229—7 |
| 2,891,711 | 6/1959 | Early | 119—51 X |
| 3,014,634 | 12/1961 | Humphrey et al. | 229—17 |
| 3,089,462 | 5/1963 | Brockmann | 119—52 |
| 3,179,244 | 4/1965 | Kuhn | 206—47 |
| 3,295,498 | 1/1967 | Brown | 119—23 |

ALDRICH F. MEDBERY, *Primary Examiner.*

U.S. Cl. X.R.

119—23; 206—47; 229—17